United States Patent
Bossler et al.

[11] 3,792,350
[45] Feb. 12, 1974

[54] DETECTION OF METALSHIELD FAULTS IN BURIED CABLE

[75] Inventors: Fred Christian Bossler, Union; William Harold Kent, Jr., Berkeley Heights, both of N.J.

[73] Assignee: Bell Telephone Laboratories, Incorporated, Murray Hill, N.J.

[22] Filed: Mar. 15, 1972

[21] Appl. No.: 234,800

[52] U.S. Cl. ............................................. 324/52
[51] Int. Cl. ........................................ G01r 31/08
[58] Field of Search ................ 324/52, 54, 67, 51

[56] References Cited
UNITED STATES PATENTS

| | | | |
|---|---|---|---|
| 1,745,419 | 2/1930 | Henneberger | 324/52 X |
| 2,586,781 | 2/1952 | Brownlow | 324/52 |
| 2,698,921 | 1/1955 | Wharton | 324/52 |
| 3,628,133 | 12/1971 | Dornberger | 324/52 |
| 3,299,351 | 1/1967 | Williams | 324/52 |
| 3,551,804 | 12/1970 | Weddle | 324/52 |
| 2,501,598 | 3/1950 | Eltenton et al. | 324/67 |
| 3,066,256 | 11/1962 | Rasor | 324/67 X |
| 3,289,076 | 11/1966 | Edis et al. | 324/67 |
| 3,526,831 | 9/1970 | Smith | 324/52 X |
| 3,617,865 | 11/1971 | Hakata | 324/67 X |

FOREIGN PATENTS OR APPLICATIONS
194,475   3/1923   Great Britain ............... 324/52

Primary Examiner—Gerard R. Strecker
Attorney, Agent, or Firm—C. E. Graves

[57] ABSTRACT

The electric field configuration generated by exciting a cable shield with an ac signal is detected by an earth prod in directions that are respectively perpendicular and parallel to the cable axis with respect to a ground plane. The field components in the vicinity of an open in the shield exhibit characteristic changes that are extensive and readily detectable with conventional amplifying equipment. Cable locating methodology is also disclosed.

3 Claims, 11 Drawing Figures

DISTANCE TO FAULT IN FEET

PROD CENTER AT 0

PROD CENTER AT 6'

DISTANCE IN FEET OF PROD CENTER FROM CABLE AT EARTH SURFACE

3,792,350

DETECTION OF METALSHIELD FAULTS IN BURIED CABLE

FIELD OF THE INVENTION

This invention relates to locating and detecting certain kinds of shield faults in telephone cables; and in particular locating and detecting open shield faults in buried telephone cable.

BACKGROUND OF THE INVENTION

A problem often encountered in maintaining buried multipair telephone cable is electrical discontinuity in the metallic shield which surrounds the cable core. These open shield faults or "opens" are variously caused by lightning, or corrosion, or improperly made splices, or some combination thereof; and are believed to be a major contributing factor to electrical noise found in the cable pairs.

When the shield fault is not a complete open circuit, particularly when it is accompanied by a break in the outer plastic jacket, it is common practice to apply an electrical signal to the shield at some access point, and then, using a detector with earth probes, detect the change in electric field as the applied current seeks out the leakage path to ground at the fault location. One such method is taught in D. L. Williams U.S. Pat. No. 3,299,351, issued Jan. 17, 1967. For detecting a complete open shield fault, however, particularly when it is not accompanied by a break in the plastic sheath, conventional methods are unavailing.

Accordingly, the following are objects of the invention:

to detect the location of an open shield fault in a buried telephone cable, swiftly and accurately;

to achieve the foregoing object with a minimum of equipment and with simple craftsmen procedures; and to supply within the same equipment that achieves the foregoing, a capacity to locate buried telephone cable.

SUMMARY OF THE INVENTION

To detect the location of a shield open, this invention proceeds from a recognition that the electric field configuration generated by exciting the cable shield with an ac signal will exhibit two components which with respect to the ground plane are respectively perpendicular and parallel to the cable. These components in the vicinity of the open shield exhibit characteristic changes that, somewhat surprisingly, are both extensive and readily detectable by earth prods and conventional amplifying equipment.

The invention and its further objects, features and advantages will be readily discerned from a reading of the description to follow of illustrative embodiments.

DETAILED DESCRIPTION OF AN ILLUSTRATIVE EMBODIMENT

Figure 1:
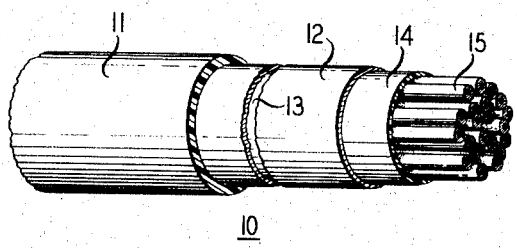
FIG. 1 is a schematic perspective diagram in partial breakaway of a standard multipair telephone cable.

FIG. 1 shows a cable 10 in cross section having an outer jacket 11 of, for example, polyethylene and a metallic shield 12 thereunder. For purposes of illustration, the shield 12 is shown as having an open, designated 13, which constitutes a complete electrical and physical discontinuity. The cable 10 typically is constructed with an inner polyethylene jacket 14 beneath the shield 12. A plurality of conductor pairs designated generally 15 constitutes the cable core.

Figure 2:
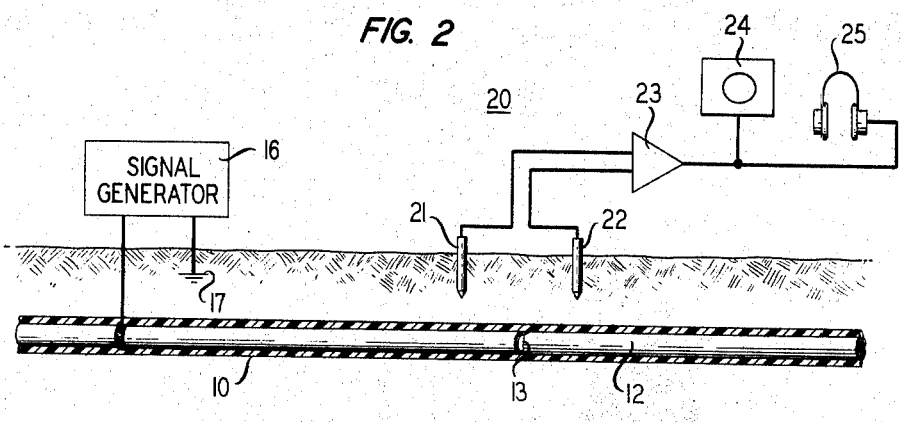
FIG. 2 is an elevation view in schematic form of a telephone cable with an open shield being detected by method of the present invention.
Figure 3:
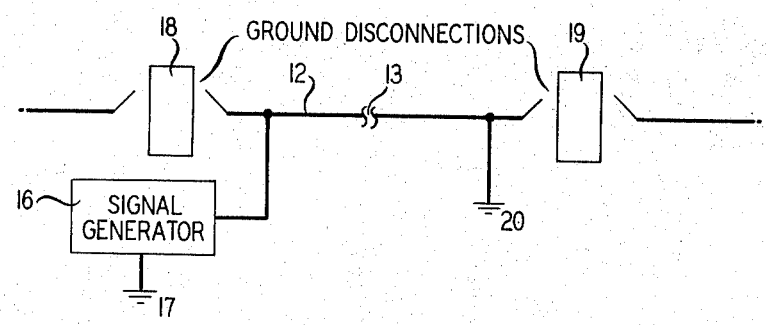
FIG. 3 is a schematic electrical diagram.

An in-service cable such as cable 10 is shown in FIG. 2 buried in the ground with the open 13 shown in the shield 12. FIG. 3 shows schematically an electrical configuration for locating the shield break 13 pursuant to this invention. A generator 16 operating at a frequency in the range 200 Hz – 10 kHz, and optimally in the range 500 Hz – 2 kHz and at a voltage level of about 16 – 18 volts is connected between an earth ground 17 and the shield 12. The ground 17 is placed remotely from the generator 16 and from the shield, by a distance of about 20 feet, in order to avoid end effects in the vicinity of the ground rod. At a location nearby generator 16—for example, the above-ground pedestal 18—the section of cable shield 12 under study is "isolated," that is, disconnected from any ground in order to limit the length of shield to be energized. Similarly, at a far end pedestal 19, the shield 12 is lifted from ground and supplied with a remote ground 20.

Figure 4:
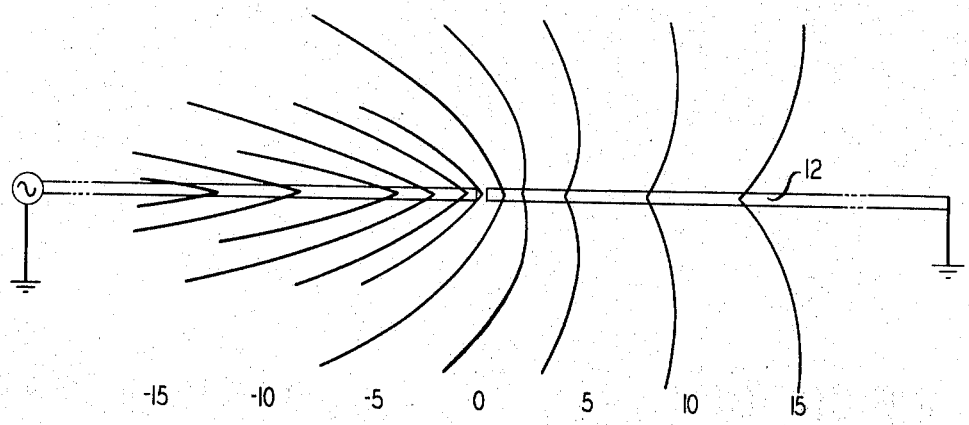
FIG. 4 is a schematic electric field diagram in plan view along a cable having an open shield.

Energizing of generator 16 creates, through capacitive coupling between the shield 12 and the earth, an electric field whose lines of force are substantially parallel to the cable axis at locations remote from the sheath open 13. However, as seen in FIG. 4, the lines of equal rms voltage in the ground plane are at an increasingly large angle with respect to the shield axis as the open 13 is approached. At the open 13, the field experiences a marked divergence. A few feet beyond the open 13 the field is nearly perpendicular to the shield.

A probe arrangement designated generally 20 in FIG. 2, and suitable for practicing the invention, consists of two earth prods 21, 22, connected to amplifier 23 which has preferably an input impedance at least high enough to exceed the soil resistance between the two prods, to avoid disturbing the field. Amplifier 23 connects to audio monitoring apparatus such as speaker 24 and/or earphones 25. The inventive method calls for monitoring of the electric field in two directions: (1) the direction perpendicular to the cable 10 as shown by prod position A of FIG. 5; and (2) parallel to the cable 10 as shown by prod position B of FIG. 5.

The preferred inventive locating method calls for the cable shield to first be located generally by any means, such as one that will be hereinafter described. Once above the cable shield, the prods 21, 22 are oriented in the position A of FIG. 5, so as to measure the electric field perpendicular to the cable. In position A, the end 21 is held directly over the cable while the other end 22 is held off to the side. An inspection of the curve denoted $E_1$ of FIG. 6 will indicate that the field strength decreases by an order of magnitude as the prod traverses the actual fault. It can also be seen that the field reading indicates what side of the fault (i.e., the near end or the far end) the prod is on.

Figure 5:
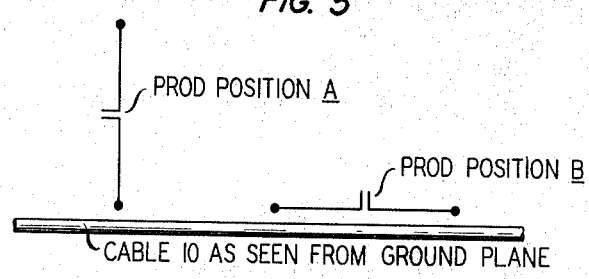
FIG. 5 is a schematic diagram showing two prod positions with respect to an open shield cable.
Figure 6:
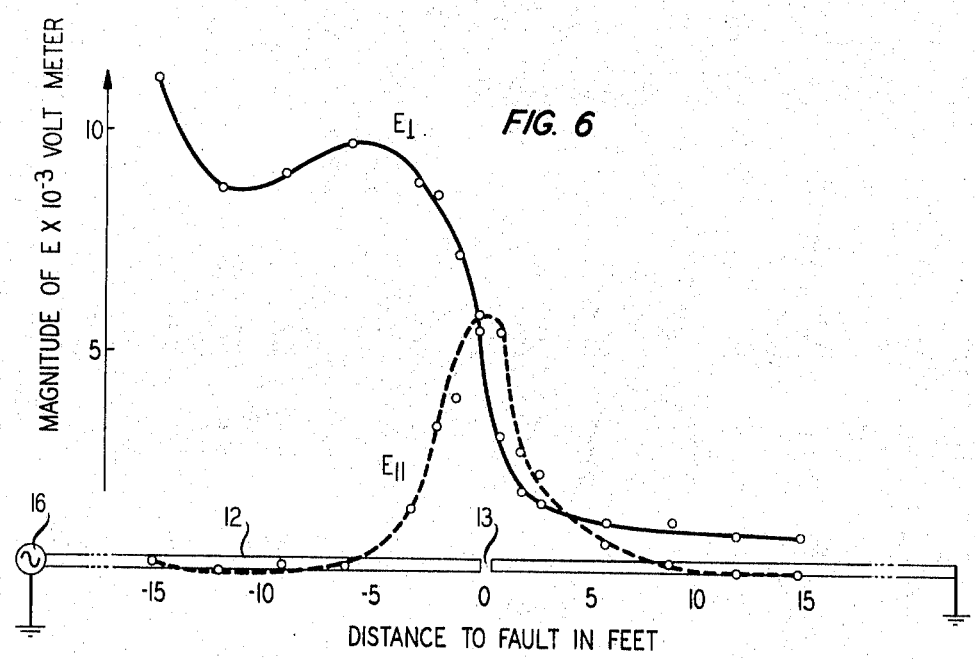
FIG. 6 is a graph of two field components in the vicinity of the open shield.

Having homed-in to within plus or minus two feet or so of shield open 13 by the above procedures, it is now advantageous pursuant to the invention to search the field parallel to the cable 10 by placing the probe into position B denoted in FIG. 5. The field strength with the probe in position B is denoted by the curve $E_{11}$ of FIG. 6. It is seen that the lines of equal rms voltage in FIG. 4 closely bunch at the point of the break; and the FIG. 6 plot shows an abrupt rise or peak in the field force at the point of the break.

Figure 7:
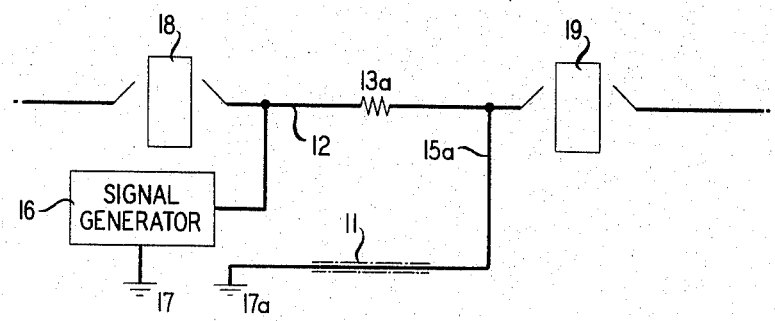
FIG. 7 is an alternate inventive embodiment showing electrical connections for detecting a partially faulted cable shield.

If the break 13 is not a complete open, but rather constitutes a resistance of, say, a few hundred ohms stemming for example from an improper shield splice, it is possible to locate this fault by a further embodiment of the inventive method. Thus, as seen in FIG. 7, a resistive fault 13a can be located by lifting the shield ground at the far end pedestal 19, and connecting it back to the remote ground 17a via an unused pair denoted 15a within cable 10. Then, the changing field across the shield fault 13a can be detected in a manner already described above.

Figure 8A:
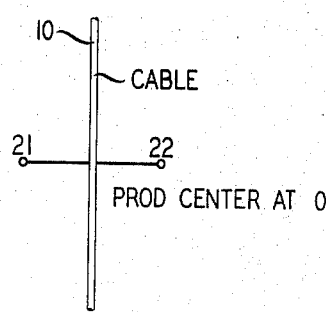
FIGS. 8A, 8B, 8C are diagrams showing use of the invention as a cable locator.
Figure 8B:
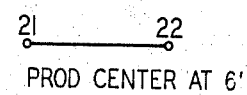
Figure 8C:
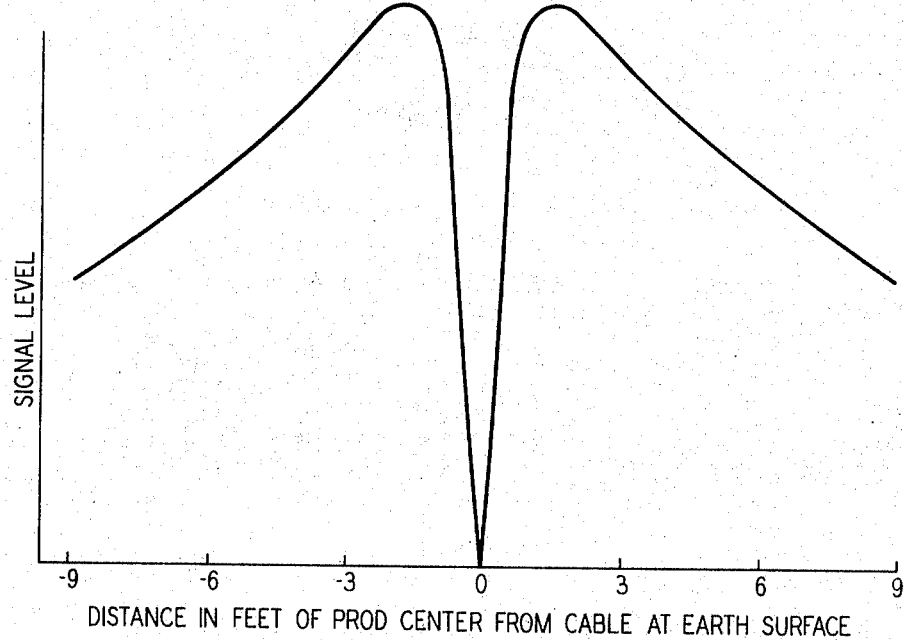
Figure 9:
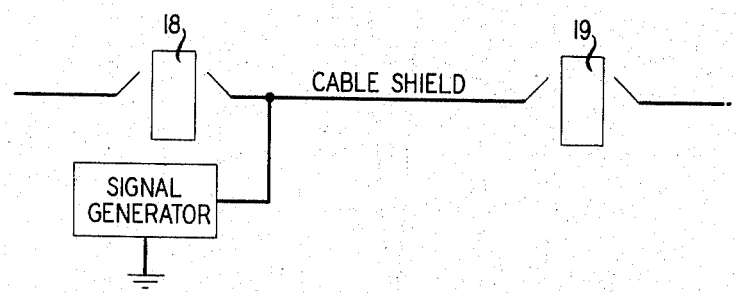
FIG. 9 is an electrical diagram.

FIGS. 8A, 8B, and 8C depict how a cable may be located with the above-described equipment. The prods 21, 22 are moved in a direction perpendicular to the axis of the cable, in the position shown schematically in FIG. 8B. With the prod center 6 feet or so to one side of the cable 10, a substantial signal level will be detected. Similarly, with the prod center a like distance on the other side of cable 10, a large signal level will be detected. When the prod center is essentially straddling the cable 10 as in FIG. 8A, the signal level will drop off dramatically as shown in the graph of FIG. 8C. For locating the cable, pursuant to this aspect of the invention, the electrical configuration depicted in FIG. 9 must be used.

It is to be understood that the embodiments described herein are merely illustrative of the principles of the invention. Various modifications may be made thereto by persons skilled in the art without departing from the spirit and scope of the invention.

What is claimed is:

1. A method for locating electrical opens in the metallic shield of a buried communications cable comprising the steps of:

at one side of said electrical open, connecting an ac signal generator between said shield and an earth ground;

grounding said shield on the other side of said open;

disconnecting said shield from any other ground connections;

energizing said generator with a signal in the range 200 Hz – 10 kHz thereby creating an electric field by capacitive coupling between said shield and the earth;

using a probe comprising two spaced-apart earth prods connected in series to amplifier means having an input impedance at least high enough to exceed the soil resistance between said prods, oriented in a position substantially perpendicular to the cable axis as viewed in the ground plane, probing the earth's surface along the cable run to detect where the field strength rate of decrease is greatest, the latter denoting the localized region where said open is located; and probing in said region with said probe oriented in a position substantially parallel to the cable axis to detect the point where the field strength exhibits an abrupt peak, the latter denoting the substantially exact location of said shield open.

2. The method of claim 1 wherein the earth ground for said generator is placed remotely from said generator and said shield.

3. The method of claim 1 wherein said generator is operated at a voltage level not in excess of 18 volts.

* * * * *